United States Patent
Onuma et al.

(10) Patent No.: US 11,428,575 B2
(45) Date of Patent: Aug. 30, 2022

(54) FLAME DETECTION SYSTEM AND RECEIVED LIGHT QUANTITY MEASURING METHOD

(71) Applicant: Azbil Corporation, Tokyo (JP)

(72) Inventors: Shun Onuma, Tokyo (JP); Raita Mori, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 270 days.

(21) Appl. No.: 16/820,034

(22) Filed: Mar. 16, 2020

(65) Prior Publication Data

US 2020/0300706 A1  Sep. 24, 2020

(30) Foreign Application Priority Data

Mar. 19, 2019 (JP) .............................. JP2019-051094

(51) Int. Cl.
  *G01J 5/00* (2022.01)
  *G01J 1/36* (2006.01)
  *G01J 1/44* (2006.01)

(52) U.S. Cl.
  CPC .............. *G01J 5/0018* (2013.01); *G01J 1/36* (2013.01); *G01J 1/44* (2013.01)

(58) Field of Classification Search
  CPC .... G01J 5/0018; G01J 1/36; G01J 1/44; G01J 1/044; G01J 1/16; G01J 1/429; G01J 5/0804; G01J 5/80; G01J 1/42; G01J 5/00; G01J 2001/444; G01J 2001/4466
  See application file for complete search history.

(56) References Cited

U.S. PATENT DOCUMENTS

| | | | |
|---|---|---|---|
| 4,823,114 A * | 4/1989 | Gotisar | F23N 5/242 431/24 |
| 9,939,317 B1 | 4/2018 | Mori | |
| 2016/0348907 A1* | 12/2016 | Mori | F23N 5/242 |
| 2018/0142890 A1* | 5/2018 | Mori | G01J 5/026 |

FOREIGN PATENT DOCUMENTS

| JP | H05-12581 A | 1/1993 |
|---|---|---|
| JP | 2018-084422 A | 5/2018 |
| JP | 2018-084423 A | 5/2018 |

* cited by examiner

*Primary Examiner* — Thanh Luu
*Assistant Examiner* — Monica T Taba

(57) ABSTRACT

A flame detection system includes: an optical sensor that detects light generated from a light source; an applied voltage generating circuit that periodically applies a drive pulse voltage to the optical sensor, discharge determining portion that detects a discharge from the optical sensor, a discharge probability calculating portion that calculates a discharge probability based on a number of times of application of the drive pulse voltage and a number of times of discharge detected in the a first state in which the optical sensor is shielded from light and a second state in which the optical sensor can receive light, a sensitivity parameter storing portion storing known sensitivity parameters of the optical sensor; and a received light quantity calculating portion that calculates the received light quantity by the optical sensor in the second state based on the sensitivity parameters and the discharge probabilities calculated in the first and second states.

8 Claims, 4 Drawing Sheets

FLAME DETECTION SYSTEM AND RECEIVED LIGHT QUANTITY MEASURING METHOD

CROSS-REFERENCE TO RELATED APPLICATION

The present application claims the benefit of and priority to Japanese Patent Application No. 2019-051094, filed on Mar. 19, 2019, the entire contents of which are incorporated by reference herein.

TECHNICAL FIELD

The present invention relates to a flame detection system configured to detect presence or absence of a flame.

BACKGROUND

As an optical sensor configured to detect the presence or absence of a flame based on ultraviolet rays emitted from a light of the flame in a combustion furnace or the like, a photoelectric tube-type ultraviolet sensor may be used. It has been observed that an irregular discharge phenomenon (pseudo discharge) caused by a noise component other than a discharge occurring due to a photoelectric effect occurs in discharge from the photoelectric tube-type ultraviolet sensor.

Patent Literature 1 proposes a flame detection system in which a pulse width of a drive pulse to be applied to a flame sensor is controlled to obtain a received light quantity of discharge from the calculation, so that a life of the flame sensor can be determined based on the light quantity. However, the discharge from the actual flame sensor includes an irregular discharge caused by a noise, which is generally referred to as a failure, and thus there is a case where the discharge occurs even when light generated by the flame does not exist and causes erroneous detection. It is necessary to consider a method of measuring the received light quantity from which the discharge of such noise components is removed.

In contrast, in the flame detection system disclosed in Patent Literature 2, a method of obtaining the received light quantity in consideration of a discharge probability of a noise component other than a regular discharge is proposed, which enables accurate detection of the presence or absence of a flame. However, in a flame detection system disclosed in Patent Literature 2, the discharge probability of the noise component needs to be known, and derivation of the discharge probability is not easy.

Alternatively, in a failure detecting apparatus disclosed in Patent Literature 3, it has been proposed to provide a shutter mechanism configured to block an electromagnetic wave incident on the flame sensor to detect a failure due to self discharge of the flame sensor. However, in the failure detecting apparatus disclosed in Patent Literature 3, there is no method of distinguishing the regular discharge of the flame sensor based on the ultraviolet rays emitted from the flame from the irregular discharge of other factors, and there is a possibility that the flame sensor erroneously determines the life of the flame sensor from the light quantity due to the irregular discharge.

CITATION LIST

Patent Literature

[PTL 1] JP-A-2018-84422
[PTL 2] JP-A-2018-84423
[PTL 3] JP-A-05-012581

SUMMARY

The present invention has been made to solve the above problems, and an object of the present invention is to provide a flame detection system and a received light quantity measuring method capable of calculating a received light quantity excluding noise components other than the regular discharge of an optical sensor.

A flame detection system according to the present invention comprises: an optical sensor configured to detect light emitted from a light source; an applied voltage generating portion configured to periodically apply a drive pulse voltage to an electrode of the optical sensor; a current detecting portion configured to detect a discharge current of the optical sensor; a discharge determining portion configured to detect a discharge of the optical sensor based on the discharge current detected by the current detecting portion; a discharge probability calculating portion configured to calculate a discharge probability based on a number of times of application of the drive pulse voltage applied by the applied voltage generating portion and a number of times of discharge detected by the discharge determining portion during the application of the drive pulse voltage for each of a first state in which the optical sensor is shielded from light and a second state in which the optical sensor can receive light; a storing portion configured to store a reference received light quantity received by the optical sensor, a reference pulse width of the drive pulse voltage, a discharge probability of a regular discharge when the pulse width of the drive pulse voltage is the reference pulse width, the received light quantity received by the optical sensor is the reference received light quantity and in the second state, a discharge probability of an irregular discharge in the second state caused by a noise component other than a discharge occurring due to a photoelectric effect of the optical sensor in advance as known sensitivity parameters of the optical sensor; and a received light quantity calculating portion configured to calculate the received light quantity received by the optical sensor in the second state based on the sensitivity parameter stored in the storing portion, the discharge probability calculated by the discharge probability calculating portion in the first state, and the discharge probability calculated by the discharge probability calculating portion in the second state.

In addition, one configuration example of the flame detection system of the present invention further includes: a light shielding means provided between the light source and the optical sensor; and a shutter control unit configured to cause the light shielding means to perform an opening and closing operation to switch the state between the first state and the second state, in which the discharge probability calculating portion calculates a discharge probability based on a number of times of application of the drive pulse voltage by the applied voltage generating portion and a number of times of discharge detected by the discharge determining portion during the application of the drive pulse voltage respectively in the first state created by the light shielding means and the second state created by the light shielding means.

Further, one configuration example of the flame detection system according to the present invention further includes a received light quantity determining portion configured to determine the presence or absence of the light source by comparing the received light quantity which is calculated by the received light quantity calculating portion with a received light quantity threshold value.

In one configuration example of the flame detection system of the present invention, the received light quantity calculating portion is configured to calculate a received light quantity Q by the optical sensor in the second state based on a reference received light quantity $Q_0$ by the optical sensor, a reference pulse width $T_0$ of the drive pulse voltage, a discharge probability $P_{aA}$ of the regular discharge, a discharge probability $P_{bA}$ of the irregular discharge, a discharge probability P* calculated by the discharge probability calculating portion in the first state, the discharge probability P calculated by the discharge probability calculating portion in the second state, a pulse width T of the drive pulse voltage in the first and second states.

A received light quantity measuring method of a flame detection system according to the present invention includes: a first step of periodically applying a drive pulse voltage to an electrode of an optical sensor when the optical sensor configured to detect light emitted from a light source is shielded from light in a first state; a second step of detecting a discharge current of the optical sensor in the first state; a third step of detecting the discharge of the optical sensor based on the discharge current in the first state; a fourth step of calculating a discharge probability in the first state based on a number of times of application of the drive pulse voltage in the first step and a number of times of discharge detected in the third step during the application of the drive pulse voltage; a fifth step of periodically applying a drive pulse voltage to the electrode of the optical sensor in the second state in which the optical sensor can receive light before or after the first to fourth steps; a sixth step of detecting discharge current of the optical sensor in the second state before or after the first to fourth steps; a seventh step of detecting the discharge of the optical sensor based on the discharge current in the second state before or after the first to fourth steps; an eighth step of calculating a discharge probability in the second state based on a number of times of application of the drive pulse voltage in the fifth step and a number of times of discharge detected in the seventh step during the application of the drive pulse voltage before or after the first to fourth steps; and a ninth step of calculating the received light quantity received by the optical sensor in the second state based on a reference received light quantity received by the optical sensor, a reference pulse width of the drive pulse voltage, a known discharge probability of a regular discharge when the pulse width of the drive pulse voltage is the reference pulse width, the received light quantity received by the optical sensor is the reference light quantity received and in the second state, a known discharge probability of an irregular discharge in the second state caused by a noise component other than a discharge occurring due to a photoelectric effect of the optical sensor, the discharge probability calculated in the fourth step, and the discharge probability calculated in the eighth step.

According to the present invention, the received light quantity excluding the noise component other than the regular discharge from the optical sensor (for example, thermal electrons, inrush current, residual ions, and the like) caused by light generated from the light source can be calculated. As a result, according to the present invention, the presence or absence of a flame can be detected with high degree of accuracy from the obtained received light quantity. In addition, according to the present invention, the possibility of erroneous determination of the life of the optical sensor caused by the received light quantity containing the noise component can be reduced.

DETAILED DESCRIPTION

Figure 1:
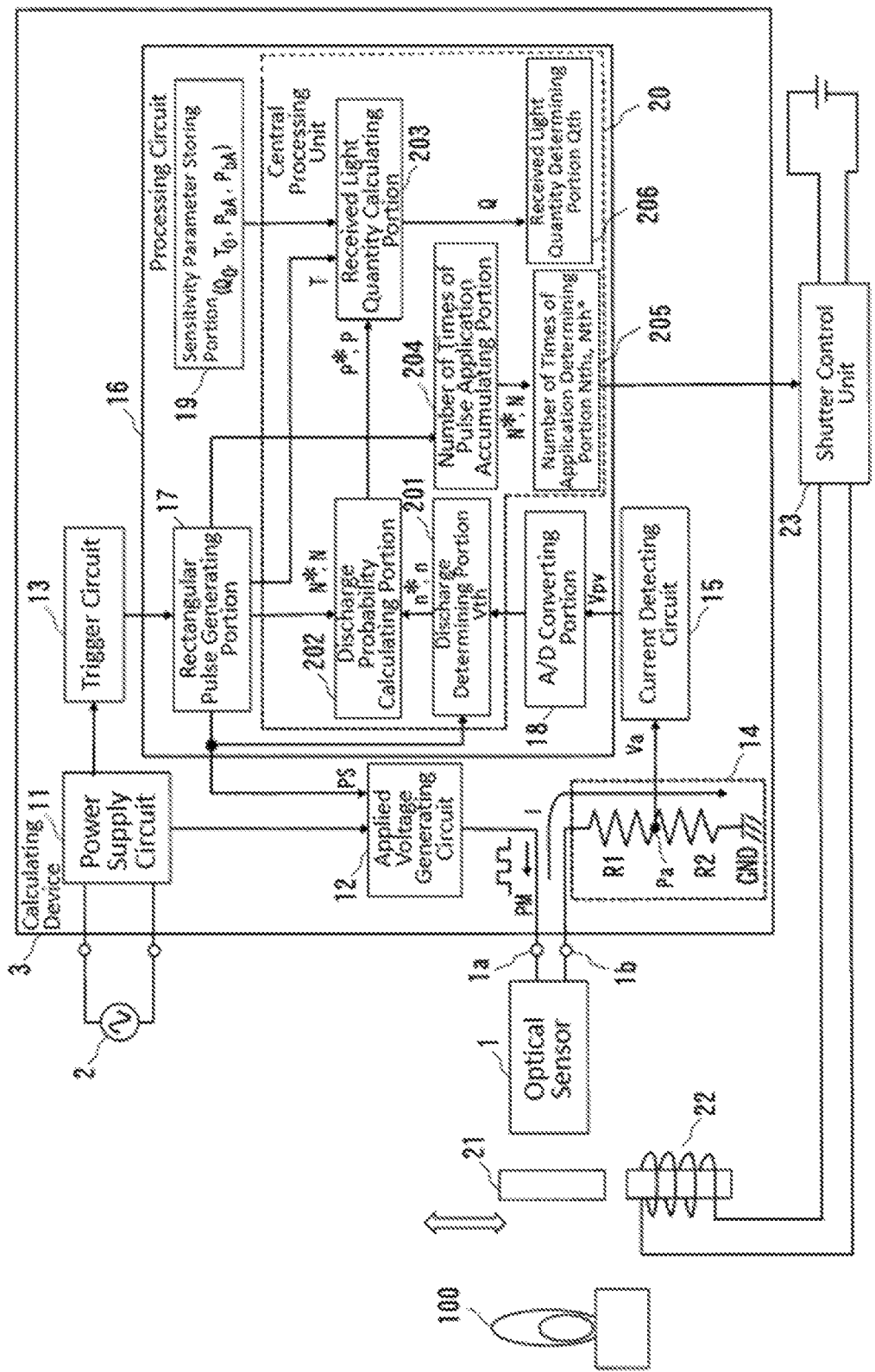
FIG. 1 is a block diagram illustrating a configuration of a flame detection system according to an embodiment of the present invention.

A method of measuring the received light quantity from which a noise component is removed will be described below. An optical sensor using a photoelectric effect is a photoelectric tube, which is energized by a photon hitting an electrode. The energization proceeds under the following conditions.

[Operation of the Optical Sensor]

When a photon hits one of the electrodes in a state in which a voltage is applied between a pair of electrodes of an optical sensor, photoelectrons are emitted at a certain probability, and an electron avalanche of electrons is produced to cause energization (discharge current flows between the electrodes).

While a voltage is applied between the electrodes, the optical sensor continues to be energized. Alternatively, when the energization of the optical sensor is confirmed, the voltage is lowered immediately, so that the energization is stopped. As described above, when the voltage between the electrodes decreases, the optical sensor terminates the energization.

The probability that the optical sensor discharges when one photon hits the electrode of the optical sensor is defined as $P_1$. The probability that the optical sensor discharges when two photons hit the electrode of the optical sensor is defined as $P_2$. Since $P_2$ is opposite to the probability that neither the first photon nor the second photon discharges, a relationship between $P_2$ and $P_1$ is expressed by Expression (1).

$$(1-P_2)=(1-P_1)^2 \qquad (1)$$

In general, where $P_n$ is the probability that the optical sensor discharges when n photons hit the electrode of the optical sensor, and $P_m$ is the probability that the optical sensor discharges when the m photons hit the electrode of the optical sensor (n and m are natural numbers), Expressions (2) and (3) are satisfied in the same manner as Expression (1).

$$(1-P_n)=(1-P_1)^n \qquad (2)$$

$$(1-P_m)=(1-P_1)^m \qquad (3)$$

From Expressions (2) and (3), Expression (4) is derived as a relationship between $P_n$ and $P_m$.

$$(1-P_n)^{\frac{1}{n}} = (1-P_m)^{\frac{1}{m}} \qquad (4)$$

$$(1-P_n)^{\frac{m}{n}} = (1-P_m)$$

$$\frac{m}{n} = \log_{(1-P_n)}(1-P_m)$$

Where E is the number of photons coming to the electrode of the optical sensor per unit time, and T is the time duration during which a voltage equal to or higher than discharge starting voltage from the optical sensor is applied between the electrodes (hereinafter referred to as "pulse width"), the number of photons that hit the electrode per every application of the voltage is expressed by ET. Accordingly, the relationship among the number of photons E, the pulse width T, and a discharge probability P when the same optical sensor is operated under a condition B which is different from a certain condition A is expressed by the following Expression (5). Here, when the number of photons to be used as a reference is defined as $E_0$ to establish $Q=E/E_0$, Expression (6) is obtained. Here, Q is referred to as the "received light quantity".

$$\frac{E_B T_B}{E_A T_A} = \log_{(1-P_A)}(1-P_B) \quad (5)$$

$$\frac{Q_B T_B}{Q_A T_A} = \log_{(1-P_A)}(1-P_B) \quad (6)$$

[Configuration and Operation of Flame Detection System]

FIG. 1 is a block diagram illustrating a configuration of the flame detection system according to an embodiment of the present invention. The flame detection system is configured to drive the optical sensor and calculate the received light quantity from the light source based on a result of the driving of the optical sensor. The flame detection system comprises an optical sensor 1 configured to detect light (ultraviolet rays) generated from a light source 100 such as a flame, an LED, a lamp or the like, an external power supply 2, a calculating device 3 to which the optical sensor 1 and the external power supply 2 are connected, a shutter 21 provided between the light source 100 and the optical sensor 1, a shutter drive unit 22 configured to drive the shutter 21, and a shutter control unit 23 configured to control the shutter 21 via the shutter drive unit 22. The shutter 21 and the shutter drive unit 22 constitute light shielding means.

The optical sensor 1 is composed of a photoelectric tube comprising a cylindrical envelope having both end portions closed, two electrode pins passing through both ends of the envelope and two electrodes supported in parallel with each other by the electrode pins inside the envelope. In the optical sensor 1 having a configuration as described above, when one electrode disposed opposite to the light source 100 is irradiated with ultraviolet rays in a state in which a predetermined voltage is applied between the electrodes via the electrode pins, electrons are emitted from the electrode by the photoelectric effect, and discharge current flows between the electrodes.

The external power supply 2 is made of, for example, an AC commercial power supply having a voltage value of 100 [V] or 200 [V].

The calculating device 3 comprises a power supply circuit 11 connected to the external power supply 2, an applied voltage generating circuit 12 and a trigger circuit 13 connected to the power supply circuit 11, a voltage dividing resistor 14 comprising resistors R1 and R2 connected in series between a terminal 1b on the downstream side of the optical sensor 1 and a ground line GND, a current detecting circuit 15 configured to detect a voltage (reference voltage) Va generated at a connection point Pa between the resistors R1 and R2 of the voltage dividing resistor 14 as a current I flowing to the optical sensor 1, and a processing circuit 16 to which the applied voltage generating circuit 12, the trigger circuit 13 and the current detecting circuit 15 are connected.

The power supply circuit 11 supplies AC power input from the external power supply 2 to the applied voltage generating circuit 12 and the trigger circuit 13. The power for driving the calculating device 3 is acquired from the power supply circuit 11 (however, a configuration in which the power for driving is acquired from another power supply independently of AC/DC is also applicable).

Figure 2:
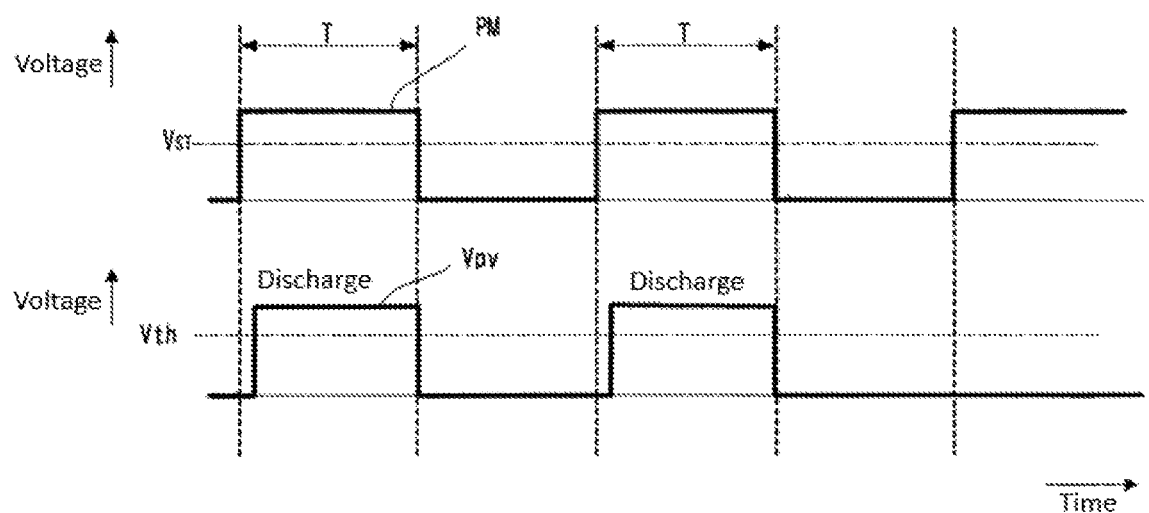
FIG. 2 is a waveform diagram illustrating a drive pulse applied to an optical sensor and a detected voltage detected in a current detecting circuit in the embodiment of the present invention.

The applied voltage generating circuit 12 (applied voltage generating portion) boosts the AC voltage applied by the power supply circuit 11 to a predetermined value to apply the voltage to the optical sensor 1. In the present embodiment, a pulse voltage (a voltage equal to or higher than a discharge starting voltage $V_{ST}$ of the optical sensor 1) of 200 [V] synchronized with the rectangular pulse PS from the processing circuit 16 is generated as a drive pulse voltage PM, and the generated drive pulse voltage PM is applied to the optical sensor 1. FIG. 2 shows the drive pulse voltage PM applied to the optical sensor 1. The drive pulse voltage PM is synchronized with the rectangular pulse PS from the processing circuit 16, and a pulse width T thereof is equal to a pulse width of the rectangular pulse PS. The rectangular pulse PS from the processing circuit 16 will be described later.

The trigger circuit 13 detects a predetermined value point of the AC voltage applied by the power supply circuit 11 and inputs a result of the detection to the processing circuit 16. In the present embodiment, the trigger circuit 13 detects a minimum value point at which the voltage value is minimum as a predetermined value point (triggering time point). Detection of one cycle of the AC voltage is enabled by detecting a predetermined value point of the AC voltage in this manner.

The voltage dividing resistor 14 generates a reference voltage Va as a divided voltage of the resistors R1 and R2 and inputs the reference voltage Va to the current detecting circuit 15. Here, since a voltage value of the drive pulse PM applied to a terminal 1a on an upstream side of the optical sensor 1 is as high as 200 [V] as described above, if a voltage generated at the terminal 1b on the downstream side when a current flows between the electrodes of the optical sensor 1 is input to the current detecting circuit 15 as is, a large load is applied to the current detecting circuit 15. Therefore, in the present embodiment, a reference voltage Va having a low voltage value is generated by the voltage dividing resistor 14, and the reference voltage Va is input to the current detecting circuit 15.

The current detecting circuit 15 (current detecting portion) detects a reference voltage Va input from the voltage dividing resistor 14 as discharge current I from the optical sensor 1 and inputs the detected reference voltage Va to the processing circuit 16 as a detected voltage Vpv.

A rectangular pulse generating portion 17 generates a rectangular pulse PS having a pulse width T at every cycle of the AC voltage applied to the trigger circuit 13 from the power supply circuit 11 every time when the trigger circuit 13 detects a triggering time point. The rectangular pulse PS generated by the rectangular pulse generating portion 17 is sent to the applied voltage generating circuit 12.

An A/D converting portion 18 performs A/D conversion on the detected voltage Vpv from the current detecting circuit 15 and sends it to a central processing unit 20.

The central processing unit 20 is implemented by hardware comprising a processor and a storage device and a program configured to achieve various functions in cooperation with the hardware, and functions as a discharge determining portion 201, a discharge probability calculating portion 202, a received light quantity calculating portion 203, a number of times of pulse application accumulating portion 204, a number of times of application determining portion 205, and a received light quantity determining portion 206.

In the central processing unit 20, the discharge determining portion 201 detects the discharge from the optical sensor 1 based on the discharge current from the optical sensor 1 detected by the current detecting circuit 15. Specifically, each time the drive pulse voltage PM is applied to the optical sensor 1 (each time the rectangular pulse PS is generated), the discharge determining portion 201 compares a detected voltage Vpv input from the A/D converting portion 18 with a threshold voltage Vth determined in advance (see FIG. 2), determines that the optical sensor 1 has discharged if the detected voltage Vpv exceeds the threshold voltage Vth, and increments the number of times of discharge n by 1.

When the number of times of application N of the drive pulse voltage PM applied to the optical sensor 1 reaches a predetermined number (when the number of pulses of the rectangular pulse PS reaches a predetermined number), the discharge probability calculating portion 202 calculates the discharge probability P of the optical sensor 1 based on the number of times of discharge n detected by the discharge determining portion 201 and the number of times of application N of the drive pulse voltage PM.

The discharge probability P is output as a flame signal. It is assumed that a certain operating condition, that is, a received light quantity $Q_0$ ($Q_0 \neq 0$) and a discharge probability $P_0$ at a pulse width $T_0$ are known. For example, a shipping inspection of the flame detection system includes a method of measuring the discharge probability P in predetermined received light quantity and pulse width. At this time, the relationship among the received light quantity Q, the pulse width T, and the discharge probability P is expressed by Expression (7). However, P=0 is assumed to be Q=0. In the present invention, cases where P=0 and P=1 are excluded from the calculation processing of the received light quantity Q.

$$\frac{QT}{Q_0 T_0} = \log_{(1-P_0)}(1 - P) \qquad (7)$$

Now, $Q_0$, $T_0$ and $P_0$ are known, and T is known because T is a pulse width controlled by the flame detection system. By applying the drive pulse voltages PM to the optical sensor 1 by a plurality of times, measuring the number of times of discharge n, and calculating the discharge probability P, the received light quantity Q which is an unknown number can be calculated from Expression (7). The received light quantity Q may be output as a flame signal.

[Operation of Flame Detection System Taking Noise into Account]

From Expression (7), when it is assumed that a discharge probability $P_{aA}$, in a certain operation condition, that is, with a received light quantity $Q_0$ and a pulse width $T_0$ being known, the relationship among the received light quantity Q, the pulse width T, and the discharge probability P is given by Expression (8).

$$(1 - P) = (1 - P_{aA})^{\frac{QT}{Q_0 T_0}} \qquad (8)$$

The relationship between the discharge of the optical sensor 1 and time is considered to be two types given below.

(a) Discharge appearing at a uniform probability during an application of the drive pulse voltage PM (Expression (8)).

(b) Discharge appearing at a rising edge of the drive pulse voltage PM.

Next, the relationship between the discharge of the optical sensor 1 and the received light quantity is considered to be two types given below.

(A) Discharge appearing in accordance with the relationship between the received light quantity and Expression (8).

(B) Discharge which appears independently of the received light quantity.

TABLE 1

| | | Relationship between Discharge Probability and Time | |
|---|---|---|---|
| | | Follows Expression (8) a | Discharges at a rising edge of the voltage b |
| Relationship between Discharge Probability and light quantity | Follows Expression (8) (The discharge probability per photon is constant irrespective of the light quantity) | A aA | bA |
| | Discharges independently of the light quantity | B aB | bB |

As in a matrix in Table 1, the noise discharge from the optical sensor 1 can be classified by the combination of (a), (b) and (A), (B). In the present invention, it is considered that high possibility of observation is achieved in a combination (aA) of (a) and (A), a combination (aB) of (a) and (B), a combination (bA) of (b) and (A), and a combination (bB) of (b) and (B).

The discharge of the combination of aA is called "sensitivity" and is a normal discharge (which has been incorporated into Expression (8)). The discharge of the combination of aB is discharge independent of a quantity of the ultraviolet rays, which may be triggered by thermal electrons or the like. The discharge in the combination of bA is discharge which depends on the light quantity among discharges, which occur in a limited way at an initial stage of a pulse due to an inrush current and residual ions. Here, the initial stage of a pulse means a time period shorter than a lower limit of an adjustment range of the pulse width T. The discharge in the combination of bB is discharge which does not depend on the light quantity among discharges, which occur in a limited way at an initial stage of a pulse due to the inrush current and the residual ions.

It should be noted that the types classified in Table 1 are not all UV (ultraviolet) failure modes. For example, there are failure modes not shown in Table 1, such as a mode in which the discharge cannot be discontinued, and a mode in which the sensitivity wavelength is different.

The discharge of aA and the noise discharge of the 3 types of aB, bA, and bB can be expressed in the form of the following Expression (9).

$$(1-P) = (1-P_{aA})^{\frac{QT}{Q_0 T_0}} \cdot (1-P_{aB})^{\frac{T}{T_0}} \cdot (1-P_{bA})^{\frac{Q}{Q_0}} \cdot (1-P_{bB}) \quad (9)$$

In Expression (9), $P_{aB}$ is a discharge probability of aB with the received light quantity Q and the pulse width T, $P_{bA}$ is a discharge probability of bA with the received light quantity Q and the pulse width T, and $P_{bB}$ is a discharge probability of bB with the received light quantity Q and the pulse width T. Individual values of the noise components $P_{aB}$, $P_{bA}$ and $P_{bB}$ in Expression (9) can be detected by the combination of the shutter 21, the light source having a known brightness, and the pulse width adjustment. If there is a known or negligible component, the measurement conditions may be relaxed.

Moreover, when the discharge probability $P_{aA}$ is known, the discharge probability $P_{aA}$ is already measured, for example, in the shipping inspection of the flame detection system, and thus the dispersion of the measurement sensitivity is small, so that a representative value can be used. When it is considered that the discharge probability $P_{aA}$ remains unchanged during the life of the product of the system, the received light quantity Q with the noise components $P_{aB}$, $P_{bA}$, $P_{bB}$ removed can be measured by the combination of the shutter 21 and the pulse width adjustment. With the shutter 21 only, the noise components $P_{aB}$ and $P_{bB}$ can be removed. With the pulse width adjustment only, the noise components $P_{bA}$ and $P_{bB}$ can be removed.

[Method of Detecting Light Quantity Using Shutter]

When the discharge probability $P_{aA}$ is known and the discharge probability $P_{bA}$ is known or negligible and the shutter 21 is used in parallel, a negligible element can be substituted by 0. By applying Q=0 (by measuring with the shutter 21 closed) in Expression (9), Expression (10) is obtained. Here, P* is a discharge probability measurement value when the shutter is closed.

$$(1-P^*) = (1-P_{aB})^{\frac{T}{T_0}} \cdot (1-P_{bB}) \quad (10)$$

The shutter 21 is opened and measurement is performed without changing the pulse width T. By substituting Expression (9) by Expression (10), the received light quantity Q is obtained as in Expression (11).

$$\frac{1-P}{1-P^*} = (1-P_{aA})^{\frac{QT}{Q_0 T_0}} \cdot (1-P_{bA})^{\frac{Q}{Q_0}} \quad (11)$$

$$Q = Q_0 \cdot \log_{(1-P_{aA})^{\frac{T}{T_0}} \cdot (1-P_{bA})} \frac{1-P}{1-P^*}$$

Figure 3:
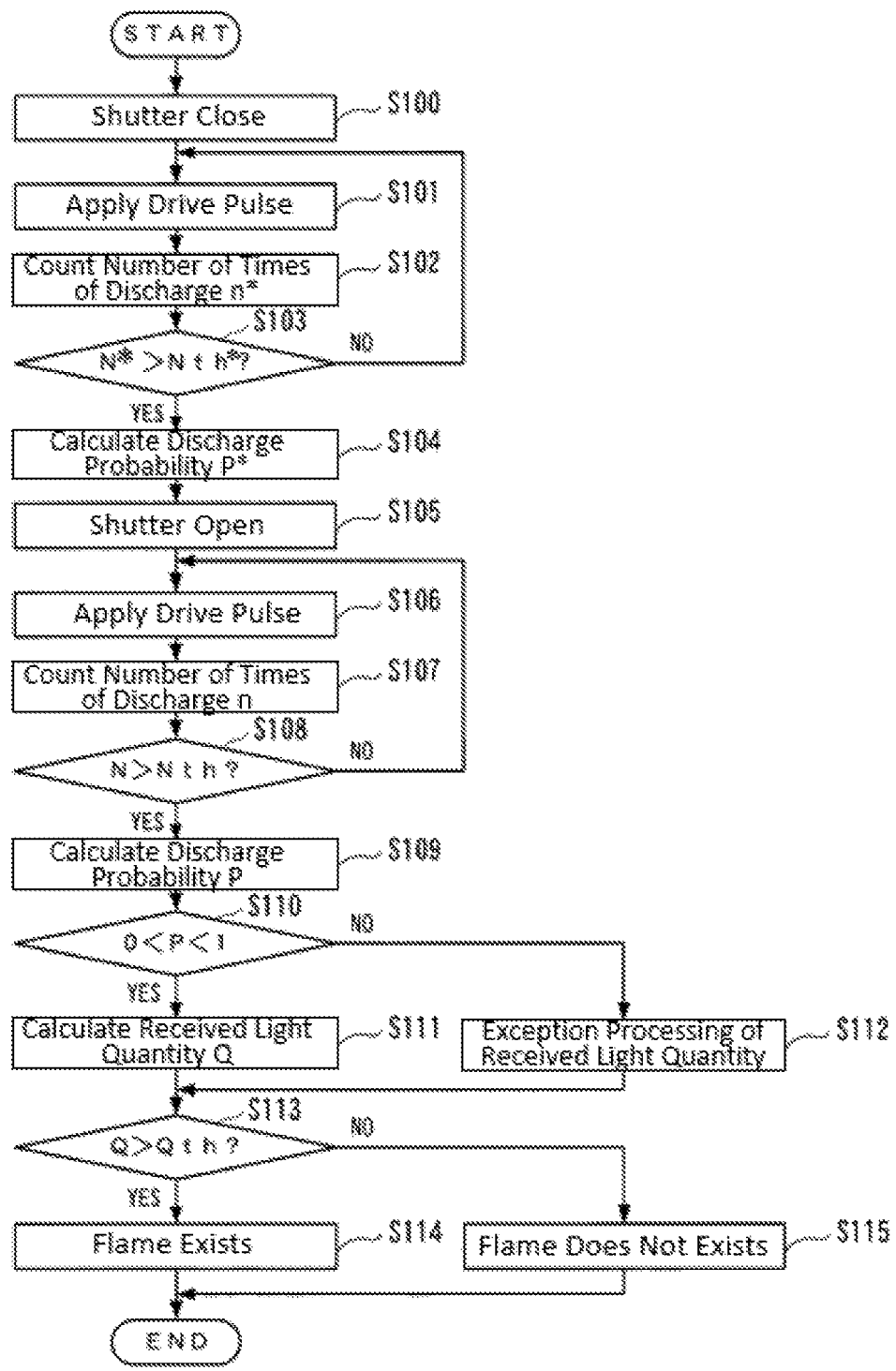
FIG. 3 is a flowchart illustrating the operation of the flame detection system according to the embodiment of the present invention.

The operation of the flame detection system of the present embodiment will now be described in more detail. FIG. 3 is a flowchart for explaining the operation of the flame detection system according to the present embodiment.

The shutter control unit 23 selectively outputs a SHUTTER OPEN signal (voltage) for causing the shutter 21 to perform an opening and closing operation, whereby switching between SHUTTER CLOSE (the first state in which the optical sensor 1 is shielded from the light source 100) and SHUTTER OPEN (the second state in which the optical sensor can receive light from the light source 100) is achieved.

In the present embodiment, the SHUTTER OPEN signal is not output in an initial state at the time of shipping inspection of the flame detection system or on site where the flame detection system is installed. Therefore, the shutter drive unit 22 closes the shutter 21 (Step S100 in FIG. 3). Accordingly, light from the light source 100 is blocked by the shutter 21, and the light incident on the optical sensor 1 is blocked.

As described above, the applied voltage generating circuit 12 applies the drive pulse voltage PM between the pair of terminals 1a and 1b of the optical sensor 1 (Step S101 in FIG. 3). At this time, the pulse width of the drive pulse PM is T.

The discharge determining portion 201 compares the detected voltage Vpv from the current detecting circuit 15 with a threshold voltage Vth determined in advance and determines that the optical sensor 1 discharges when the detected voltage Vpv exceeds the threshold voltage Vth. When the discharge determining portion 201 determines that the optical sensor 1 discharges once, the discharge determining portion 201 counts this discharge as a number of times of discharge n* (Step S102 in FIG. 3). Needless to say, an initial value of the number of times of discharge n* and an initial value of the number of times of application N* of the drive pulse voltage PM to be described later are both 0. In this manner, the processes in Steps S101 and S102 are repeatedly executed.

The number of times of pulse application accumulating portion 204 counts the rectangular pulse PS output from the rectangular pulse generating portion 17 to count the number of times of application N* of the drive pulse voltage PM.

The number of times of application determining portion 205 compares the number of times of application N* of the drive pulse voltage PM with the predetermined number Nth*.

When the number of times of application determining portion 205 determines that the number of times of application N* of the drive pulse voltage PM from the start of application of the drive pulse voltage PM in Step S101 exceeds the predetermined number Nth* (YES in Step S103 in FIG. 3), the discharge probability calculating portion 202 calculates the discharge probability P* based on the number of times of application N* (=Nth*+1) of the drive pulse voltage PM at this time and the number of times of discharge n* detected by the discharge determining portion 201 by Expression (12) (Step S104 in FIG. 3).

$$P^* = n^*/N^* \quad (12)$$

The shutter control unit 23 outputs a SHUTTER OPEN signal when the number of times of application determining portion 205 determines that the number of times of application N* of the drive pulse voltage PM exceeds the predetermined number Nth* and the calculation of the discharge probability P* is ended.

When the SHUTTER OPEN signal is output from the shutter control unit 23, the shutter drive unit 22 opens the shutter 21 (Step S105 in FIG. 3). When the shutter 21 is opened, a state in which the optical sensor 1 can receive light is achieved. Light from the light source 100 is incident on the optical sensor 1.

The applied voltage generating circuit 12 applies the drive pulse voltage PM between the pair of terminals 1a and 1b of the optical sensor 1 in the same manner as Step S101 (Step S106 in FIG. 3). At this time, the pulse width of the drive pulse PM is also T.

In the same manner as Step S102, the discharge determining portion 201 compares the detected voltage Vpv from the current detecting circuit 15 with the threshold voltage Vth, determines that the optical sensor 1 discharges when the detected voltage Vpv exceeds the threshold voltage Vth, and the number of times of discharge n increments by one (Step S107 in FIG. 3). Needless to say, an initial value of the number of times of discharge n and an initial value of the number of times of application N of the drive pulse voltage PM to be described later are both 0. In this manner, the processes in Steps S106 and S107 are repeatedly executed.

When the number of times of application determining portion 205 determines that the number of times of application N of the drive pulse voltage PM from the start of application of the drive pulse voltage PM in Step S106 exceeds the predetermined number Nth (YES in Step S108 in FIG. 3), the discharge probability calculating portion 202 calculates the discharge probability P based on the number of times of application N (=Nth+1) of the drive pulse voltage PM at this time and the number of times of discharge n detected by the discharge determining portion 201 by Expression (13) (Step S109 in FIG. 3).

$$P = n/N \tag{13}$$

The sensitivity parameter storing portion 19 stores a reference received light quantity $Q_0$ by the optical sensor 1, a reference pulse width $T_0$ of the drive pulse voltage PM, the discharge probability $P_{aA}$ of the regular discharge in a state in which the pulse width of the drive pulse voltage PM is the reference pulse width $T_0$, the received light quantity received by the optical sensor 1 is the reference received light quantity $Q_0$ and the optical sensor 1 can receive light, and the discharge probability $P_{bA}$ of the irregular discharge in a state in which the optical sensor 1 can receive light, which is caused by a noise component other than a discharge occurring due to a photoelectric effect, as known sensitivity parameters of the optical sensor 1 in advance. These sensitivity parameters are assumed to be measured in advance, for example, in the shipping inspection of the flame detection system.

When the discharge probability P calculated by the discharge probability calculating portion 202 is greater than 0 and less than 1 (YES in Step S110 in FIG. 3), the received light quantity calculating portion 203 calculates the received light quantity Q by Expression (11) based on the discharge probabilities P and P* calculated by the discharge probability calculating portion 202, the pulse width T of the drive pulse voltage PM when obtaining the discharge probabilities P and P*, and the parameters $Q_0$, $T_0$, $P_{aA}$ and $P_{bA}$ stored in the sensitivity parameter storing portion 19 (Step S111 in FIG. 3).

In addition, when the discharge probability P calculated by the discharge probability calculating portion 202 is 0 (NO in Step S110), the received light quantity calculating portion 203 sets the received light quantity Q to 0 or performs an exception process which disables calculation of the received light quantity Q (Step S112 in FIG. 3). In addition, when the discharge probability P is 1 (NO in Step S110), the received light quantity calculating portion 203 performs the exception process which disables calculation of the received light quantity Q (Step S112).

Next, the received light quantity determining portion 206 compares the received light quantity Q calculated by the received light quantity calculating portion 203 with the predetermined received light quantity threshold value Qth (Step S113 in FIG. 3), and when the received light quantity Q exceeds the received light quantity threshold value Qth (YES in Step S113), determines that flame exists (Step S114 in FIG. 3). In addition, when the received light quantity Q is equal to or less than the received light quantity threshold value Qth (NO in Step S113), the received light quantity determining portion 206 determines that the flame does not exist (Step S115 in FIG. 3).

As is understood from the description given thus far, according to the present embodiment, the received light quantity Q from which the noise component other than the regular discharge from the optical sensor 1 caused by ultraviolet rays emitted from light from the light source 100 is removed can be calculated. As a result, in the present embodiment, the presence or absence of a flame can be detected accurately from the obtained received light quantity Q. In addition, according to the present embodiment, the possibility of erroneous determination of the life of the optical sensor 1 caused by the received light quantity Q containing the noise component can be reduced.

In the present embodiment, the processing in Steps S105 to S109 is performed after the processing in Steps S100 to S104. However, the present embodiment is not limited thereto, and the processing in Steps S100 to S104 may be performed after the processing in Steps S105 to S109 is performed.

Although the present invention is applied to the flame detection system having a shutter mechanism in the present embodiment, the present invention can also be applied to a flame detection system without a shutter mechanism.

In this case, when the processing in Steps S101 to S104 is performed at the time of shipping inspection of the flame detection system or on site where the flame detection system is installed, the optical sensor 1 may be shielded from the light source 100 by attaching a cover to the optical sensor 1, for example. At this time, a signal indicating that the optical sensor 1 is shielded from the light source 100 is input to the flame detection system, for example, by a user's operation. Accordingly, the central processing unit 20 of the flame detection system performs the processing in Steps S101 to S104.

When the processing of Steps S106 to S109 is performed, the state in which the optical sensor 1 is shielded from the light source 100 may be released to achieve a state in which the optical sensor 1 can receive light. At this time, a signal indicating the state in which the optical sensor 1 can receive light is input to the flame detection system, for example, by a user's operation. Accordingly, the central processing unit 20 of the flame detection system performs the processing in Steps S106 to S109.

The sensitivity parameter storing portion 19 and the central processing unit 20 described in the present embodiment can be implemented by a computer comprising a Central Processing Unit (CPU), a storage device, and an interface, and a program configured to control these hardware resources.

Figure 4:
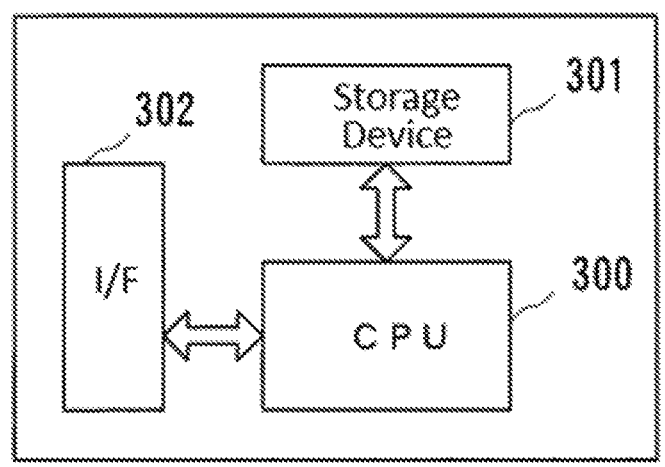
FIG. 4 is a block diagram illustrating a configuration example of a computer which realizes the flame detection system according to the embodiment of the present invention.

A configuration example of the computer is illustrated in FIG. 4. The computer comprises a CPU 300, a storage device 301, and an interface device (hereinafter abbreviated as I/F) 302. To the I/F 302, the applied voltage generating circuit 12, the rectangular pulse generating portion 17, the A/D converting portion 18, the shutter control unit 23 and the like are connected. A program for causing the computer as described above to achieve the received light quantity measuring method according to the present invention is stored in the storage device 301. The CPU 300 executes the processing described in the present embodiment in accordance with the program stored in the storage device 301.

INDUSTRIAL APPLICABILITY

The present invention can be applied to a flame detection system.

REFERENCE SIGNS LIST

1: optical sensor, 2: external power supply, 3: calculating device, 11: power supply circuit, 12: applied voltage generating circuit, 13: trigger circuit, 14: voltage dividing resistor, 15: current detecting circuit, 16: processing circuit, 17: rectangular pulse generating portion, 18: A/D converting portion, 19: sensitivity parameter storing portion, 20: central processing unit, 21: shutter, 22: shutter drive unit, 23: shutter control unit, 201: discharge determining portion, 202: discharge probability calculating portion, 203: received light quantity calculating portion, 204: number of times of pulse application accumulating portion, 205: number of times of application determining portion, 206: received light quantity determining portion

The invention claimed is:

1. A flame detection system comprising:
an optical sensor configured to detect light emitted from a light source;
an applied voltage generating portion configured to periodically apply a drive pulse voltage to an electrode of the optical sensor;
a current detecting portion configured to detect a discharge current of the optical sensor;
a discharge determining portion configured to detect a discharge of the optical sensor based on the discharge current detected by the current detecting portion;
a discharge probability calculating portion configured to calculate a discharge probability based on a number of times of application of the drive pulse voltage applied by the applied voltage generating portion and a number of times of discharge detected by the discharge determining portion during the application of the drive pulse voltage for each of a first state in which the optical sensor is shielded from the light source and a second state in which the optical sensor is not shielded from the light source;
a storing portion configured to store, in advance as known sensitivity parameters of the optical sensor,
a reference received light quantity received by the optical sensor,
a reference pulse width of the drive pulse voltage,
a discharge probability of a regular discharge in the second state when a pulse width of the drive pulse voltage is the reference pulse width and the received light quantity received by the optical sensor is the reference received light quantity, and
a discharge probability of an irregular discharge in the second state caused by a noise component other than a discharge occurring due to a photoelectric effect of the optical sensor; and
a received light quantity calculating portion configured to calculate the received light quantity received by the optical sensor in the second state based on
the sensitivity parameters stored in the storing portion,
the discharge probability calculated by the discharge probability calculating portion in the first state, and
the discharge probability calculated by the discharge probability calculating portion in the second state.

2. The flame detection system according to claim 1, further comprising:
a light shield provided between the light source and the optical sensor; and
a shutter control unit configured to cause the light shield to perform an opening and closing operation to switch between the first state and the second state,
in which
the discharge probability calculating portion calculates the discharge probability based on the number of times of application of the drive pulse voltage by the applied voltage generating portion and the number of times of discharge detected by the discharge determining portion during the application of the drive pulse voltage respectively in the first state created by the light shield and the second state created by the light shield.

3. The flame detection system according to claim 1, further comprising:
a received light quantity determining portion configured to determine a presence or an absence of light from the light source by comparing the received light quantity which is calculated by the received light quantity calculating portion with a received light quantity threshold value.

4. The flame detection system according to claim 1, wherein
the received light quantity calculating portion is configured to calculate a received light quantity Q received by the optical sensor in the second state by $$Q = Q_0 \cdot \log_{(1-P_{aA})^{\frac{T}{T_0}} \cdot (1-P_{bA})} \frac{1-P}{1-P^*}$$

where
$Q_0$ is the reference received light quantity received by the optical sensor,
$T_0$ is the reference pulse width of the drive pulse voltage,
$P_{aA}$ is the discharge probability of the regular discharge,
$P_{bA}$ is the discharge probability of the irregular discharge,
$P^*$ is the discharge probability calculated by the discharge probability calculating portion in the first state,
P is the discharge probability calculated by the discharge probability calculating portion in the second state, and
T is the pulse width of the drive pulse voltage in the first and second states.

5. A received light quantity measuring method of a flame detection system comprising:
periodically applying a drive pulse voltage to an electrode of an optical sensor in a first state in which the optical sensor configured to detect light emitted from a light source is shielded from the light source;
detecting a discharge current of the optical sensor in the first state;
detecting a discharge of the optical sensor based on the detected discharge current in the first state;
calculating a discharge probability in the first state based on a number of times of the periodically applying of the drive pulse voltage in the first state and a number of times of the detected discharge of the optical sensor during the periodically applying of the drive pulse voltage in the first state;
periodically applying the drive pulse voltage to the electrode of the optical sensor in a second state in which the optical sensor is not shielded from the light source;

detecting the discharge current of the optical sensor in the second state;

detecting the discharge of the optical sensor based on the detected discharge current in the second state;

calculating a discharge probability in the second state based on a number of times of the periodically applying of the drive pulse voltage in the second state and a number of times of the detected discharge of the optical sensor during the periodically applying of the drive pulse voltage in the second state; and calculating a received light quantity received by the optical sensor in the second state based on
- a reference received light quantity received by the optical sensor,
- a reference pulse width of the drive pulse voltage,
- a known discharge probability of a regular discharge in the second state when a pulse width of the drive pulse voltage is the reference pulse width and the received light quantity received by the optical sensor is the reference received light quantity,
- a known discharge probability of an irregular discharge in the second state caused by a noise component other than a discharge occurring due to a photoelectric effect of the optical sensor,
- the calculated discharge probability in the first state, and
- the calculated discharge probability in the second state.

6. The received light quantity measuring method of a flame detection system according to claim 5, further comprising:

controlling a light shield provided between the light source and the optical sensor to switch between the first state and the second state.

7. The received light quantity measuring method of a flame detection system according to claim 5, further comprising:

determining a presence or an absence of light from the light source by comparing the calculated received light quantity in the second state and a received light quantity threshold value.

8. The received light quantity measuring method of a flame detection system according to claim 5, wherein the received light quantity calculating comprises a step of calculating the received light quantity Q received by the optical sensor in the second state by $$Q = Q_0 \cdot \log_{(1-P_{aA})^{\frac{T}{T_0}} \cdot (1-P_{bA})} \frac{1-P}{1-P_*}$$

where $Q_0$ is the reference received light quantity received by the optical sensor, $T_0$ is the reference pulse width of the drive pulse voltage, $P_{aA}$ is the discharge probability of the regular discharge, $P_{bA}$ is the discharge probability of the irregular discharge, $P_*$ is the calculated discharge probability in the first state, $P$ is the calculated discharge probability in the second state, and $T$ is the pulse width of the drive pulse voltage in the first and second states.

* * * * *